United States Patent
Guy

(10) Patent No.: US 12,465,981 B2
(45) Date of Patent: Nov. 11, 2025

(54) CEMENTED CARBIDE CUTTING INSERT FOR PARTING METAL WORKPIECES

(71) Applicant: ISCAR, LTD., Tefen (IL)

(72) Inventor: Yaakov Guy, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 393 days.

(21) Appl. No.: 18/059,152

(22) Filed: Nov. 28, 2022

(65) Prior Publication Data

US 2024/0075535 A1    Mar. 7, 2024

Related U.S. Application Data

(60) Provisional application No. 63/404,464, filed on Sep. 7, 2022.

(51) Int. Cl.
B23B 27/16 (2006.01)
B23B 27/04 (2006.01)
B23B 29/04 (2006.01)

(52) U.S. Cl.
CPC ........... B23B 27/1611 (2013.01); *B23B 27/04* (2013.01); *B23B 29/043* (2013.01)

(58) Field of Classification Search
CPC ..... B23B 27/1611; B23B 27/04; B23B 27/14; B23B 27/22; B23B 27/045; B23B 29/043
See application file for complete search history.

(56) References Cited

U.S. PATENT DOCUMENTS

| | | | |
|---|---|---|---|
| 3,760,474 A | 9/1973 | Stein | |
| 4,778,311 A * | 10/1988 | Niemi | B23B 27/045 |
| | | | D15/139 |
| 4,969,779 A * | 11/1990 | Barten | B23B 27/045 |
| | | | 407/115 |
| 5,156,502 A | 10/1992 | Satran | |
| 5,244,318 A * | 9/1993 | Arai | B23C 5/2213 |
| | | | 407/42 |
| 5,511,911 A * | 4/1996 | Katbi | B23B 27/045 |
| | | | 407/116 |

(Continued)

FOREIGN PATENT DOCUMENTS

| | | |
|---|---|---|
| EP | 3 421 159 A1 | 1/2019 |
| JP | 2018-75677 | 5/2018 |

(Continued)

OTHER PUBLICATIONS

International Search Report dated Nov. 28, 2023, issued in PCT counterpart application No. PCT/IL2023/050880.

(Continued)

*Primary Examiner* — Sara Addisu

(74) *Attorney, Agent, or Firm* — Womble Bond Dickinson (US) LLP

(57) ABSTRACT

A two-cutting-edge parting insert including a first cutting portion, a second cutting portion and an elongated body portion connecting the first and second cutting portions. The elongated body portion has a body width (BW) measurable parallel to a lateral axis and a body length (BL) measurable parallel to an elongation axis. The body width is smaller than both cut widths of the cutting edges of the first and second body portions and fulfills the condition: $0.65 \text{ mm} \leq BW \leq 0.95 \text{ mm}$; and the body length fulfills the condition: $2 \text{ mm} \leq BL \leq 14 \text{ mm}$.

21 Claims, 2 Drawing Sheets

(56) References Cited

U.S. PATENT DOCUMENTS

| | | | |
|---|---|---|---|
| 5,676,495 A * | 10/1997 | Katbi | B23B 27/045 407/115 |
| 5,725,334 A * | 3/1998 | Paya | B23B 27/065 407/104 |
| 5,836,723 A | 11/1998 | Von Haas et al. | |
| 5,934,843 A | 8/1999 | Brask et al. | |
| 5,975,812 A | 11/1999 | Friedman | |
| 6,176,649 B1 | 1/2001 | Friedman | |
| 6,238,147 B1 * | 5/2001 | Tagtstrom | B23B 27/045 407/116 |
| 6,261,032 B1 | 7/2001 | Duwe et al. | |
| 6,273,651 B1 | 8/2001 | Heinloth et al. | |
| 6,428,247 B1 | 8/2002 | Friedman | |
| 6,582,163 B2 | 6/2003 | Hansson et al. | |
| 7,094,006 B2 | 8/2006 | Hecht | |
| 7,419,337 B2 | 9/2008 | Berminge | |
| 7,510,355 B2 | 3/2009 | Havrda | |
| 7,665,933 B2 * | 2/2010 | Nagaya | B23B 27/045 407/116 |
| 7,883,300 B1 * | 2/2011 | Simpson, III | B23B 27/045 407/115 |
| 7,905,687 B2 * | 3/2011 | Dufour | B23C 5/202 407/42 |
| 8,104,999 B2 * | 1/2012 | Hecht | B23B 29/043 407/113 |
| 8,366,355 B2 * | 2/2013 | Nagaya | B23B 27/04 407/115 |
| 8,449,225 B2 | 5/2013 | Gati | |
| 8,647,028 B2 | 2/2014 | Athad | |
| 8,647,029 B2 | 2/2014 | Hecht | |
| 8,696,262 B2 | 4/2014 | Hecht | |
| 8,784,014 B2 * | 7/2014 | Onodera | B23B 27/045 407/115 |
| 9,033,622 B2 | 5/2015 | Hecht | |
| 9,120,239 B2 | 9/2015 | Hecht | |
| 9,242,300 B2 | 1/2016 | Kaufmann et al. | |
| 10,363,722 B2 | 7/2019 | Athad | |
| 10,569,336 B2 * | 2/2020 | Kusuda | B23B 27/007 |
| 10,857,603 B2 | 12/2020 | Athad | |
| 11,278,968 B2 | 3/2022 | Guy | |
| 2002/0122700 A1 * | 9/2002 | Inayama | B23B 27/045 407/117 |
| 2004/0086415 A1 | 5/2004 | Gubanich et al. | |
| 2004/0101374 A1 * | 5/2004 | Ejderklint | B23B 27/045 407/117 |
| 2006/0269367 A1 * | 11/2006 | Havrda | B23B 27/045 407/117 |
| 2008/0240874 A1 | 10/2008 | Nagaya et al. | |
| 2008/0286057 A1 * | 11/2008 | Nagaya | B23B 27/04 407/110 |
| 2009/0092453 A1 * | 4/2009 | Jonsson | B23B 27/045 407/108 |
| 2009/0162154 A1 | 6/2009 | Jonsson et al. | |
| 2009/0285645 A1 * | 11/2009 | Hecht | B23B 27/04 407/107 |
| 2010/0067992 A1 * | 3/2010 | Uchijo | B23B 27/16 407/103 |
| 2010/0119314 A1 | 5/2010 | Nagaya et al. | |
| 2011/0110733 A1 | 5/2011 | Hecht | |
| 2011/0158756 A1 | 6/2011 | Athad | |
| 2011/0255926 A1 | 10/2011 | Hecht | |
| 2012/0297941 A1 * | 11/2012 | Inoue | B23B 27/045 407/100 |
| 2013/0058729 A1 | 3/2013 | Choi et al. | |
| 2013/0129428 A1 | 5/2013 | Henry et al. | |
| 2013/0170917 A1 | 7/2013 | Hecht | |
| 2013/0183109 A1 * | 7/2013 | Fujii | B23B 27/22 407/115 |
| 2013/0192431 A1 * | 8/2013 | Inoue | B23B 27/045 407/115 |
| 2013/0202372 A1 | 8/2013 | Hecht | |
| 2014/0050542 A1 | 2/2014 | Zeeb et al. | |
| 2014/0072379 A1 | 3/2014 | Hecht | |
| 2014/0133924 A1 | 5/2014 | Oren et al. | |
| 2014/0199128 A1 | 7/2014 | Hecht | |
| 2014/0290450 A1 * | 10/2014 | Fujii | B23B 27/22 407/100 |
| 2014/0321926 A1 | 10/2014 | Sadikov | |
| 2014/0348601 A1 | 11/2014 | Hecht | |
| 2015/0003924 A1 | 1/2015 | Jansson et al. | |
| 2015/0056029 A1 * | 2/2015 | Shimamoto | B23B 27/045 407/115 |
| 2015/0063929 A1 | 3/2015 | Hecht | |
| 2015/0224581 A1 * | 8/2015 | Tsuda | B23B 27/045 407/115 |
| 2016/0207115 A1 * | 7/2016 | Ikenaga | B23B 27/045 |
| 2016/0271703 A1 * | 9/2016 | Inoue | B23B 27/045 |
| 2017/0157678 A1 * | 6/2017 | Inoue | B23B 27/14 |
| 2017/0333997 A1 | 11/2017 | Kusuda | |
| 2018/0133806 A1 | 5/2018 | Son et al. | |
| 2018/0272431 A1 | 9/2018 | Athad | |
| 2019/0160555 A1 | 5/2019 | Hecht et al. | |
| 2020/0298319 A1 | 9/2020 | Hecht et al. | |
| 2021/0023633 A1 | 1/2021 | Athad | |
| 2023/0373011 A1 | 11/2023 | Erlich et al. | |
| 2024/0286201 A1 * | 8/2024 | Fukuhara | B23B 27/04 |

FOREIGN PATENT DOCUMENTS

| | | | | |
|---|---|---|---|---|
| WO | WO-2011093333 A1 * | 8/2011 | | B23B 27/045 |
| WO | WO 2011/159119 | 12/2011 | | |
| WO | WO-2011149091 A1 * | 12/2011 | | B23B 27/005 |
| WO | WO 2015/099369 | 7/2015 | | |
| WO | WO 2022/084992 | 4/2022 | | |

OTHER PUBLICATIONS

Written Opinion dated Nov. 28, 2023, issued in PCT counterpart application No. PCT/IL2023/050880.

* cited by examiner

CEMENTED CARBIDE CUTTING INSERT FOR PARTING METAL WORKPIECES

RELATED APPLICATIONS

The present application claims priority to U.S. Provisional Patent Application No. 63/404,464 filed Sep. 7, 2022. The contents of the above-identified application are incorporated by reference in their entirety.

FIELD OF THE INVENTION

The subject matter of the present invention relates to cemented carbide cutting inserts for parting metal workpieces (hereinafter "parting insert" or "insert(s)" for succinctness).

BACKGROUND OF THE INVENTION

The present invention refers to inserts for parting metal workpieces. It will be understood that an insert configured for parting is also configured for grooving because both involve a similar machining process. Namely, both operations involve a forward only movement relative to the workpiece (stated differently, without a side or lateral movement component). The difference between parting and grooving operations is only the extent that a cutting edge of the insert, which cuts or machines a slit-shaped cut (an example of a slit-shaped cut of the type being discussed is shown and designated "S" in FIG. 7B of WO 2022/084992; also called hereinafter "slit"), enters into the workpiece. In a grooving operation, unlike the parting operation, the slit extends comparatively less into the workpiece, i.e. less than about half the rotating workpiece, and therefore does not 'part' the workpiece into two separate parts. In a parting operation, the slit-shaped cut extends far enough into the workpiece to part the workpiece (i.e. completely separate a piece therefrom).

To be clear, in the specification and claims of the present application, the insert is called a parting insert, but it should be understood that such parting insert is also inherently configured to manufacture grooves of a slit of the type shown in WO 2022/084992.

In order to create said slit, a cutting edge of the insert extends along the entire lateral length of the insert (i.e. a lateral direction, or sideways direction, being perpendicular to the forward direction). The lateral extent of the cutting edge, including the corners, is called the cut width (commonly denoted "CW", as exemplified and shown in FIG. 2C of U.S. Pat. No. 11,278,968, although in that publication it is called the "cutting width $W_C$").

Notably, the present invention includes so-called neutral and right and left type inserts, wherein, in a plan view of the rake surface (such plan view being exemplified in FIG. 2C of U.S. Pat. No. 11,278,968, although other names for such view are exchangeable as noted in said publication), the cutting edge may extend perpendicular or slanted to the forward direction. See FIGS. 2, 3 and 4 of the present application where plan views of rake surfaces are shown of inserts which are identical except for being neutral, left and right type inserts, respectively.

To elaborate, referring to FIG. 2 of the present application, an insert 100 is shown which is elongated along an elongation axis $A_E$. The elongation axis $A_E$ defining a forward (or cutting) direction $D_F$ and a rearward direction $D_R$ opposite thereto. For the purposes of this explanation only, a first cutting edge 102 is chosen to be an operational cutting edge and therefore when the insert is moved in a forward direction $D_F$ towards a workpiece (not shown) it is used to part or groove the workpiece. At the opposite end of the insert 100 from the first cutting edge 102 there is a second cutting edge 104 which will only become operational after the insert is indexed in a tool pocket (not shown).

A lateral axis $A_L$ extending through the forwardmost part of the cutting edge 102, extends perpendicular to the elongation axis $A_E$ and defines a first side direction $D_{S1}$ and a second side direction $D_{S2}$ opposite thereto.

For the sake of completeness, it is noted that a first central axis $A_{C1}$ (also referred to as "vertical axis $A_{C1}$") extends through the center of the insert and perpendicular to both the elongation axis $A_E$ and the lateral axis $A_L$.

A second central axis $A_{C2}$, shown also in FIGS. 5C and 5D, extends through the center of the insert and perpendicular to the elongation axis $A_L$ and parallel to the lateral axis $A_L$.

Since the insert 100 exemplified is 180° rotationally symmetric about the first central axis $A_{C1}$ (i.e., the vertical axis) only the first cutting edge 102 will be discussed in detail.

The first cutting edge 102 comprises a forwardmost cutting sub-edge 102A (i.e. the furthermost portion of the first cutting edge 102 in the forward direction $D_F$); a first left side sub-edge 102B extending in a basic rearward direction from a first corner 102D connecting the forwardmost cutting sub-edge 102A and the first side sub-edge 102B; and a first right side sub-edge 102C extending in a basic rearward direction from a second corner 102E connecting the forwardmost cutting sub-edge 102A and the first right side sub-edge 102C.

The first cutting edge 102 seen in FIG. 2 is a neutral cutting edge, meaning that the forwardmost cutting sub-edge 102A is basically parallel with the lateral axis $A_L$.

By contrast, a so-called "left" insert 200 is shown in FIG. 3, which is identical in all respects except for the cutting edge, the forwardmost cutting sub-edge 202A is oblique relative to the lateral axis $A_L$. More precisely, the forwardmost cutting sub-edge 202A extends in the second side direction $D_{S2}$ and the rearward direction $D_R$ to form an acute angle 204 with the lateral axis $A_L$.

Similarly, a so-called "right" insert 300 is shown in FIG. 3, which is identical in all respects except for the cutting edge, the forwardmost cutting sub-edge 302A is oblique relative to the lateral axis $A_L$. More precisely, the forwardmost cutting sub-edge 302A extends in the first side direction $D_{S1}$ and the rearward direction $D_R$ to form an acute angle 304 with the lateral axis $A_L$.

In summary, since different cutting edge shapes fall within the scope of the present invention, lengths discussed and defined below, which are related to a forwardmost cutting sub-edge 102A, should be measured from a forwardmost point thereof.

Further general issues and common parting insert features will now be discussed relating to such inserts.

A first key consideration for a parting insert is cut width CW. Cut width CW of a parting insert is generally preferred to be as small as possible to reduce wastage of the workpiece being machined. However, due to strength and machining force considerations, operators have no choice but to select a relatively large cut width to ensure there is no breakage. In U.S. Pat. No. 11,278,968, describing an invention by the current inventor, there is a parting insert designed to offset such machining forces to ensure that even a smaller than previously known insert does not break under relatively high-force machining conditions. Nonetheless, the general selection preference is to choose as small as possible a cut width for a given machining operation, taking into account machining forces.

Some common parting insert features will be described below with reference to numerals designating features in the drawings in U.S. Pat. No. 11,278,968, all of which is being done for ease of understanding of typical design features.

At a cutting portion, the front and lateral surfaces (24, 78, 80) adjacent the cutting edge (i.e. extending downward therefrom) are typically relieved (i.e. "relief surfaces") so that they do not touch the slit in the workpiece being formed by the cutting edge. In other words, they extend in both a downwards and inwards direction.

The cutting edge (54) is formed along an intersection of a so-called rake (also referred to as the "upper surface") surface (22) and said front and lateral surfaces (24, 78, 80) of the insert.

The rake surface (22) typically has a chip-forming configuration (56), usually comprising one or more downwardly extending recesses but can alternatively be comprised of or include upward projections, although this is less common.

Rearward of the cutting edge, in a plan view of the rake surface (22), similar to the front and lateral surfaces (24, 78, 80), at least a portion of the insert body directly adjacent to the rake surface is relieved from the cut width defined by the cutting edge (see FIG. 2C). Stated differently, said portion is thinner than the cut width (i.e. extends in an inward lateral direction on both sides), so the insert body does not contact the slit in the workpiece being formed by the cutting edge.

Currently, the most popular material for inserts is cemented carbide. During production, cemented carbide is pressed and then sintered. During the sintering process, the inserts, particularly those having a thin elongated shape, which is particularly desired for small cut widths, can become distorted. This is yet another significant design consideration for parting inserts.

The above-described features are typical for insert types relevant to the present invention (i.e., cemented carbide inserts configured for parting operations).

A second key design consideration of a parting insert is depth of the cut (which will be designated "DC" hereinafter). A relatively larger a depth of cut is preferred as it allows a cutting tool to part both smaller and relatively larger diameter workpieces (or relatively deeper grooves etc.). The depth of cut is limited by either the insert or tool having a portion wider than the cutting edge producing the slit. To explain, the cutting edge produces the slit and the insert enters into the workpiece at least partially. When an enlarged portion of either the insert or tool, in a plan view of the rake surface, first reaches the workpiece, the insert cannot enter further without undesired impact, since the enlarged portion (of either the insert or the tool) cannot enter the slit produced by the cutting edge. Accordingly, it is preferred that at least as much of the insert as possible, in a plan view of the rake surface, be thinner than the cutting edge, i.e. "relieved", so that it does not contact the walls of slit being machined.

The optimal solution is thus to allow an unlimited depth of cut (at least from the insert) by designing the insert to be thinner in its entirety, in a plan view of the rake surface, and thus the depth of cut is limited only by the tool.

This can be provided, in a first example, by an insert with a single-cutting-edge and the remainder of the cutting insert being thinner, in a plan view of the rake surface, than said cutting edge. Accordingly, said single-cutting-edge offers unlimited depth of cut capability, at least not limited by the insert itself, even though at some point the tool holding it will limit depth of cut. Hereinafter this design will be called a classic single-cutting-edge insert (or "single-cutting-edge insert").

Possibly the most commonly sold parting insert is a single-cutting-edge insert (one arbitrarily chosen example being that shown in U.S. Pat. No. 11,278,968). A single-cutting-edge insert comprises a cutting portion which in turn comprises a rake surface and relief surfaces extending basically downwardly and inwardly from the rake surface. Only a single-cutting-edge is formed at an intersection of said rake surface and relief surfaces. The insert further comprises, rearward of the cutting portion, a shank portion designed to be secured or held to a tool (said "tool" may be a blade or insert holder with a square or round shank, etc.).

Thus, a third key design consideration of inserts is fulfilled by said popular single-cutting-edge insert, namely that it can be made with the minimum amount of expensive cemented carbide material possible, and can be pressed-to-size (i.e. does not require a separate grinding, although in certain cases it is carried out for applications requiring it). Generally speaking, however, inserts that are pressed to size are devoid of ground surfaces.

A fourth key design consideration of inserts is the number of cutting edges, wherein each additional cutting edge is preferred since the insert can be used for machining for an overall longer amount of time (i.e. increased "tool-life") before being disposed.

Thus, a second type of highly popular parting insert has two-cutting-edges, the additional cutting edge being a significant benefit over a single-cutting-edge insert. A two-cutting-edge insert provides additional economic value to the user by allowing a second cutting edge to be used subsequent to a first cutting edge being worn out.

In the most common configuration, which is the one discussed here, each cutting edge is located at an opposite end of the same rake surface. Hereinafter this design will be called a classic two-cutting-edge insert. The rake surface comprising first and second sub-rake surfaces which are both visible in the same plan view of the rake surface. Each sub-rake-surface being separated by a relatively thinner elongated body portion, in a plan view of the rake surface. Stated differently, the insert comprises two cutting portions and a body portion extending therebetween, and each cutting portion comprises a respective one of the first and second sub-rake surfaces.

However, a depth of cut that can be produced by such insert is limited by the distance between the two cutting portions (i.e. where the cutting insert widens again to the point where it contacts the slit being produced, which is also the second sub-rake-surface).

Therefore the classic two-cutting-edge insert has one main advantage (number of cutting edges) and one main disadvantage compared to the single-cutting-edge insert (depth of cut).

There is also a moderate disadvantage of the classic two-cutting-edge insert design, namely that the cut width CW cannot be made as small as the single-cutting-edge insert (for example the smallest cut width that the Applicant provides with a single-cutting-edge insert is 0.6 mm and with a two-cutting-edge insert is 1.4 mm). This difference is a result of the elongated body portion of a classic two-cutting-edge insert design being distorted during the sintering process if it is made unacceptably thin.

Additionally, there is a minor disadvantage of the classic two-cutting-edge insert design, namely that it necessitates more material due to a second cutting portion being required.

A known design, developed to overcome the main disadvantage, i.e. depth of cut limitation, of a classic two-cutting-edge insert, is a so-called "twisted insert". An example of a twisted insert can be seen in U.S. Pat. No. 5,156,502. The twisted insert differs from the classic two-cutting-edge insert in that the two cutting portions are not in a parallel plane but twisted relative to each other so that the rake faces do not face exactly the same direction. This adjusts the non-operative cutting edge such that in a plan view of the rake surface of the operative cutting edge the remainder of the insert is thinner than the cut width CW.

A major advantage of the twisted insert over the classic two-cutting-edge insert design is that it allows for an unlimited depth of cut (at least with respect to the insert and not the tool holding it).

A disadvantage of the twisted insert when compared with the classic two-cutting-edge insert is that it is only manufacturable with relatively larger cut widths (all the more so when compared to the extremely small cut widths of the smaller single-cutting-edge inserts) and some compromises are made in relation to securing the insert to a pocket.

In summary, the three well-known and sold insert types, described above, include a single-cutting-edge insert which has the advantage of unlimited depth of cut and is the cheapest insert to produce, a classic two-cutting-edge insert which has a major advantage of another cutting edge but is significantly limited in depth of cut and slightly limited in cut width and manufacturing cost relative to the single-cutting-edge insert, and a twisted two-cutting-edge insert which has both the advantages of unlimited depth of cut and two cutting edges, but is even more limited than the other two with regards to cut width.

As each solution has advantages and disadvantages, there is a long felt need in the industry for a better solution. Accordingly, many different solutions have been conceived to provide an even better parting insert, with a few such solutions from the present Applicant mentioned below.

One solution was developed was a two-cutting-edge insert with an enlarged central portion (marketed by the Applicant Iscar Inc. under the name DO-GRIP DGN 1002, hereinafter the "DGN insert"), which can produce small cut widths (1 mm) which is smaller than the cut widths of the above-mentioned classic two-cutting-edge inserts but not the smallest single-cutting-edge inserts, and of course has the benefit of two cutting edges, but due to the enlarged central portion is expensive to produce and the depth of cut is extremely limited (3 mm).

Yet another solution disclosed in U.S. Pat. No. 10,363,722 B2, is a relatively large two-edged insert without an enlarged central portion. By providing such a large insert, a relatively large depth of cut and relatively small cut width (less than 1.5 mm is stated in the patent) is possible. However, the height of the insert is very large and hence the insert is costly due to a large amount of material, and rather unique insert pockets are required therefor.

It is an object of the present invention to provide a new and improved parting insert.

Such object is not a simple task, because many solutions for improved parting inserts have been attempted, a small number of which are detailed above.

SUMMARY OF THE INVENTION

In the search for an improved parting insert in view of the known variables identified above, it was conceived to provide a modified cemented carbide two-cutting-edge insert (hereinafter) with a superior (i.e. smaller) cut width which could compete with a single-cutting-edge insert in the smallest cut width range.

It is believed such insert was hitherto not produced thus far due to a known problem of deformation of a thin elongated insert during a sintering process.

As will be understood, straightness of a parting insert, which is intended to enter a slit, to a large extent of the length thereof, is critical for the machining process of parting.

To elaborate, the difficulty faced with such design, as mentioned above, is the inherent problematic nature of production of extremely thin elongated cemented carbide inserts, which are prone to deformation.

Said deformation could have been countered by thickening the insert (which is undesired here, since cut width is preferably as small as possible), which essentially would result in a classic two-cutting-edge insert of a cut width which is known.

Alternatively, said deformation could have been countered by shortening the insert (undesired here, since shortening the distance between the thicker cutting portions results in a relatively smaller depth of cut and reduces the workpiece diameter range that can be parted), which essentially would result in an insert having similar capabilities to the DGN insert.

Yet another difficulty, is that regardless of the length of the insert, a cut width as small as that achievable with a classic single-cutting-edge insert would never be obtainable since the larger size two-cutting-edge insert would always have a larger width to avoid distortion in the sintering process.

Accordingly, to minimize the chances for distortion, while still obtaining an advantageous cut width and depth of cut having some value, the present invention was provided with a slightly disadvantageous cut width larger than the smaller cut-width single-cutting-edge inserts (0.6 mm), yet smaller than a cut width than the known classic two-cutting-edge inserts (1.4 mm) and therefore advantageous when compared thereto.

To achieve said cut-width, yet another compromise was made, namely to further minimize the risk of deformation, a second step of providing a shorter length than a classic two-cutting-edge insert, thereby limiting the depth of cut, in order to further mitigate expected deformation. While this also reduces the applicability of use (i.e. only smaller-diameter workpieces can be parted), it is believed that the overall benefit of a better than previously known cut width for a classic two-cutting-edge insert, coupled with an advantage over the classic single-cutting-edge insert in that there are two cutting edges, provides a possible new and advantageous insert at least for a niche portion of the market.

During production of a prototype, despite concerns, it was found that the dimensions described below were found to have sufficiently small deformation so as to be within acceptable tolerances.

As explained above, many niche-type inserts have been attempted, for example, the present invention has a comparative cut width to the DGN 1002 insert, yet a significantly larger depth of cut.

Additionally, the present invention has a smaller depth of cut than an insert according to U.S. Pat. No. 10,363,722, and a slightly smaller cut width, but uses far less expensive material during manufacture.

In accordance with a first aspect of the present invention, there is provided a two-cutting-edge parting insert comprising: a first cutting portion; a second cutting portion; an elongated body portion connecting the first and second cutting portions; a rake surface; a base surface located opposite the rake surface; and a peripheral surface connecting the rake and base surfaces; the peripheral surface comprising: a front sub-surface at the first cutting portion; a rear sub-surface located at the second cutting portion and located opposite the front sub-surface; a left sub-surface connecting the front and rear sub-surfaces and located at one side of the parting insert; and a right sub-surface connecting the front and rear sub-surfaces and located opposite the left sub-surface; the body portion is elongated along an elongation axis extending through the center of the body portion; the elongation axis ($A_E$) defines a forward direction ($D_F$) from the second cutting portion towards the first cutting portion and a rearward direction ($D_R$) opposite to the forward direction; the parting insert having an insert length (IL) measured along the elongation axis ($A_E$); the parting insert having a height (H) measured perpendicular to the elongation axis ($A_E$); a first central axis ($A_{C1}$) is defined as perpendicular to the elongation axis and extending through the center of the parting insert and through the base surface and rake surface, the first central axis ($A_{C1}$) defining an upward direction ($D_U$) from the base surface towards the rake surface and a downward direction ($D_D$) opposite to the upward direction; a second central axis ($A_{C2}$) is defined as perpendicular to both the elongation axis ($A_E$) and the first central axis ($A_{C1}$) and extending through the center of the parting insert, the second central axis ($A_{C2}$) defining a first side direction ($D_{S1}$) and a second side direction ($D_{S2}$) opposite thereto; the first cutting portion comprising: a first sub-rake surface at the rake surface; a first front sub-relief surface at the front sub-surface; a first left sub-relief surface at the left sub-surface; a first right sub-relief surface at the right sub-surface; a first cutting edge formed at an intersection of the first front sub-rake surface and each of the first front sub-relief surface, first left sub-relief surface and first right sub-relief surface; the first cutting edge comprising: a first forwardmost cutting sub-edge extending along an intersection of the first sub-rake surface and the first front sub-relief surface; a first left side sub-edge extending along an intersection of the first sub-rake surface and the first left sub-relief surface; a first right side sub-edge extending along an intersection of the first sub-rake surface and the first right sub-relief surface; a first left corner formed at an intersection of the first forwardmost cutting sub-edge and the first left side sub-edge; and a first right corner formed at an intersection of the first forwardmost cutting sub-edge and the first right side sub-edge; the second cutting portion comprising: a second sub-rake surface at the rake surface; a second front sub-relief surface at the rear sub-surface; a second left sub-relief surface at the right sub-surface; a second right sub-relief surface at the left sub-surface; a second cutting edge formed at an intersection of the second front sub-rake surface and each of the second front sub-relief surface, second left sub-relief surface and second right sub-relief surface; the second cutting edge comprising: a second forwardmost cutting sub-edge extending along an intersection of the second sub-rake surface and the second front sub-relief surface; a second left side sub-edge extending along an intersection of the second sub-rake surface and the second left sub-relief surface; a second right side sub-edge extending along an intersection of the second sub-rake surface and the second right sub-relief surface; a second left corner formed at an intersection of the second forwardmost cutting sub-edge and the second left side sub-edge; and a second right corner formed at an intersection of the second forwardmost cutting sub-edge and the second right side sub-edge; a lateral axis ($A_L$) extends through a forwardmost part of the first cutting edge, the lateral axis ($A_L$) extending parallel to the second central axis ($A_{C2}$) and defining a first side direction (DS1) and a second side direction ($D_{S2}$) opposite first side direction ($D_{S1}$); the first cutting edge has a first cut width (CW1) measurable parallel to the lateral axis and from the first left corner to the first right corner; the second cutting edge has a second cut width (CW2) measurable parallel to the lateral axis and from the second left corner to the second right corner; the elongated body portion has a body width (BW) measurable parallel to the lateral axis and a body length (BL) measurable parallel to the elongation axis; wherein: the body width (BW): is smaller than both the first cut width (CW1) and the second cut width (CW2); and fulfills the condition: 0.65 mm≤BW≤0.95 mm; and the body length (BL): fulfills the condition: 2 mm≤BL≤14 mm.

Stated differently, in accordance with a second aspect of the present invention, there is provided a two-cutting-edge parting insert comprising:
 a first cutting portion;
 a second cutting portion;
 a body portion connecting the first and second cutting portions;
 a rake surface;
 a base surface located opposite the rake surface; and
 a peripheral surface connecting the rake and base surfaces;
the first cutting portion comprising a first sub-rake surface at the rake surface;
the second cutting portion comprising a second sub-rake surface at the rake surface;
the body portion has a body width (BW) measurable parallel to the lateral axis and a body length (BL) measurable parallel to the elongation axis;
the body width (BW): fulfills the condition: 0.65 mm≤BW≤0.95 mm; and
the body length (BL): fulfills the condition: 2 mm≤BL≤14 mm.

It will be understood that according to each of the aspects above it was found that a body portion with the given dimensions was producible within an acceptable amount of distortion.

Preferably, the body width (BW): fulfills the condition: 0.75 mm≤BW. It will be understood that increasing the body width reduces the amount of distortion. It is also preferred that BW≤0.85 mm to allow ample clearance from the cut width.

While a body length of even just larger than 2 mm is beneficial, since it is known from the DGN insert that there is a market demand for a depth of cut DC of merely 3 mm (bearing in mind the cutting portion itself has a length) it is of course preferable the body length (BL) be longer. For example it is preferable that the body length (BL) fulfills the condition: 6 mm≤BL, more preferably 8 mm≤BL. It will be understood that even though increasing the body length increases distortion, it allows a greater number of machining operations to be feasible (e.g. parting relatively larger workpieces). Additionally, it provides another advantage over smaller single-cutting-edge inserts in that the overall length of the insert is longer and therefore easier to hold and move. Nonetheless, too large a body length is considered to risk increasing the distortion to unacceptable levels, and therefore an upper limit of 14 mm is defined above to avoid increasing distortion to an unacceptable amount. Preferably, the condition BL≤12 mm and more preferably BL≤11 mm is fulfilled.

Preferably, the first cut width (CW1) and the second cut width (CW2) fulfill the condition: 0.9 mm≤CW1, CW2≤1.1 mm. It will be understood that while this cut width is less advantageous than the smallest cut widths (~0.6 mm) for the smaller single-cutting-edge inserts, it is still advantageous over the smallest two-cutting-edge inserts known to the applicant at this time. It should also be understood that reduction of the cut width means that the insert is less capable of handling cutting forces and therefore to maintain a possibility of machining at a reasonable feed rate a minimum cut width value of 0.9 mm is preferred. Similarly, in order to have an increased benefit over cut widths of known classic two-cutting-edge inserts, a maximum cut width value of 1.1 mm is preferred. A most preferred cut width being equal to 1.0 mm±0.04 mm.

Preferably, the parting insert has a first operative length OL1, measurable parallel to the elongation axis from a forwardmost point of the first cutting edge until an intersection of the body portion and the second cutting portion (i.e. where the insert starts to widen relative to the body portion), fulfilling the condition: 5 mm≤OL1≤15 mm. More preferably, fulfilling the condition 9 mm≤OL1≤13.5 mm, and most preferably 11 mm≤OL1≤12.5 mm. As explained above, even though increasing the body length increases distortion, it allows a greater number of machining operations to be feasible and allows an insert to be easier to hold. However, a length too large risks increasing the distortion to unacceptable levels, and therefore an upper limit is preferred.

The parting insert can comprise an insert length IL, measurable parallel to the elongation axis $A_E$. Preferably, the insert length IL fulfills the condition 4 mm≤IL≤16 mm, more preferably 11 mm≤IL≤15 mm and most preferably 13 mm≤IL≤14 mm.

The first cutting portion 110 further comprises a first cutting portion length $L_{C1}$, measurable parallel to the elongation axis $A_E$. Preferably, the first cutting portion length $L_{C1}$ fulfills the condition 1.25 mm≤$L_{C1}$≤1.5 mm and most preferably 1.30 mm≤$L_{C1}$≤1.40 mm. The same values being preferred also for a second cutting portion length $L_{C2}$.

Preferably, the parting insert is pressed to size (and hence not ground and therefore devoid of ground surfaces). Being pressed to size increases, for example, the manufacturing advantage over larger type inserts such as the DGN insert and the insert disclosed in U.S. Pat. No. 10,363,722. Notably, ground inserts are identifiable as they present oriented lines. To elaborate, a skilled person can determine if an insert has been ground because even after a very fine post coating treatment such as polishing, since post-treatments remove material and leave a visible pattern of parallel lines, as opposed to unground inserts which have more random marks.

Preferably, the parting insert is 180° rotationally symmetric about the first central axis $A_{C1}$.

Preferably, a height H of the body portion fulfills the condition 3.5 mm≤H≤4.5 mm, more preferably 4.0 mm≤H≤4.3 mm. This corresponds to the height of the classic two-cutting-edge inserts, and it is preferred not to reduce this dimension since that would increase distortion with no notable benefit.

It was found, however, that the corners could preferably be produced to have a radii R fulfilling the condition 0.8 mm≤R≤1.20 mm, which is improved over the 0.16 mm radii of the Applicant's existing classic two-cutting-edge insert.

Preferably, each of the first and second cutting portions comprises a chip-former arrangement. More preferably the chip-former arrangement comprises a single depression.

The inserts above will now be compared using an arbitrary grading system (the relative values being assigned after looking specifically at these inserts compared with each other) of 1 to 5, where "1" is the lowest grade and "5" is the highest grade, and using the criteria of (a) depth of cut (where a larger depth of cut is preferred), (b) cut width (where a smaller cut width is preferred, the values shown being the smallest values of the Applicant's products and patent and being approximate where a real world product is not marketed), (c) material cost (where a relatively small amount of material is preferred; while not mentioned in the name "material cost" also manufacturing complexity is included in this category) and (d) two cutting edges (where two cutting edges are preferred over a single cutting edge).

While the values shown below are subjective and subject to many factors, they give an indication as to the basic considerations taken into account when developing the insert of the present application which is tailored to smaller cut width applications.

| Insert type | Depth of Cut | Cut Width CW (smallest CW) | Material Cost | Edge efficiency (Number of edges) | Total |
|---|---|---|---|---|---|
| Classic single-cutting-edge insert | 5 (unlimited) | 5 (0.6 mm) | 5 | 3 (one) | 18 |
| Classic two-cutting-edge insert | 4 | 4 (1.4 mm) | 4.5 | 5 (two) | 17.5 |
| Twisted two-cutting-edge insert | 5 (unlimited) | 3 (3 mm) | 4.5 | 5 (two) | 17.5 |
| DGN 1002 | 1 (3 mm) | 4.5 (~1 mm) | 3 | 5 (two) | 13.5 |
| U.S. Pat. No. 10,363,722 | 4.5 | 4 (~1.5 mm or less) | 3 | 5 (two) | 16.5 |
| Present invention | 3 | 4.5 (~1 mm) | 4.5 | 5 (two) | 17 |

Generally speaking, the classic single-cutting-edge is still advantageous over the remaining two-cutting-edge types, at least at the smallest cut-width sizes.

Nonetheless, at a unique cut width size of about 1 mm (or more precisely 1 mm 0.1 mm) it is believed there is benefit in the introduction of a new two-cutting-edge insert of the classic two-cutting-edge insert type.

After producing a prototype, it was found that at such size distortion was at acceptable levels.

Some disclaimers regarding the values are as follows:

The cut width values assume the chosen application of smaller cut widths being desirable. For heavy duty machining applications the smaller cut widths may conversely be undesirable since they structural strength may be preferred over conserving workpiece material.

While it is basically true that two cutting edges are preferred over a single cutting edge, the indication that two-cutting-edges is far superior to a single-cutting-edge, is not accurate because in practice an insert often breaks meaning that the operator loses the ability to utilize a second cutting edge of the same insert (which is typically a more expensive insert than the single-cutting-edge inserts).

In summary and in view of the table above, a parting insert according to the present invention is: advantageous over a single-edged insert in that it has two-cutting-edges yet is significantly inferior thereto in respect to depth of cut and slightly inferior with respect to cut width; slightly advantageous over a classic two-edged insert in that it has a slightly smaller cut-width, yet is inferior thereto in respect to depth of cut; advantageous over a twisted two-edged insert in that it has a significantly smaller cut-width yet is inferior thereto in respect to depth of cut; advantageous over a DGN insert in that it has a larger depth of cut and a smaller manufacturing cost; and slightly advantageous in respect of cut width and a smaller manufacturing cost over the insert disclosed in U.S. Pat. No. 10,363,722, yet is inferior in respect to depth of cut.

BRIEF DESCRIPTION OF THE DRAWINGS

For a better understanding of the subject matter of the present invention, and to show how the same may be carried out in practice, reference will now be made to the accompanying drawings derived from a scale model, in which.

DETAILED DESCRIPTION

Figure 3:
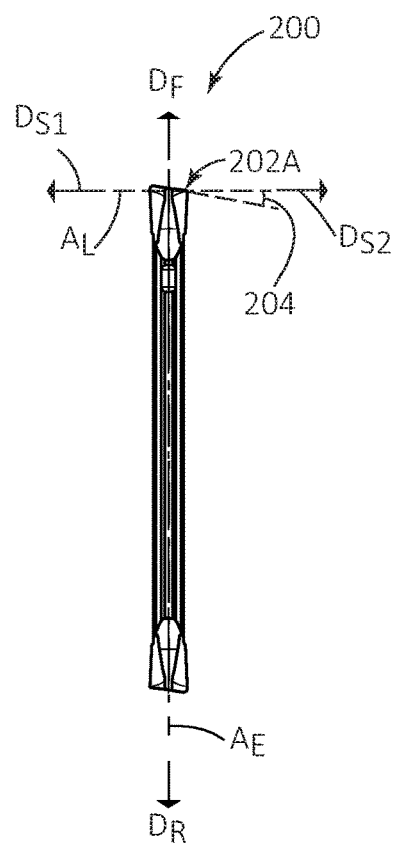
FIG. 3 is a plan view of a rake surface of another insert according to the present invention and only differing to the insert in FIG. 1 in that it is a "left" type insert.
Figure 4:
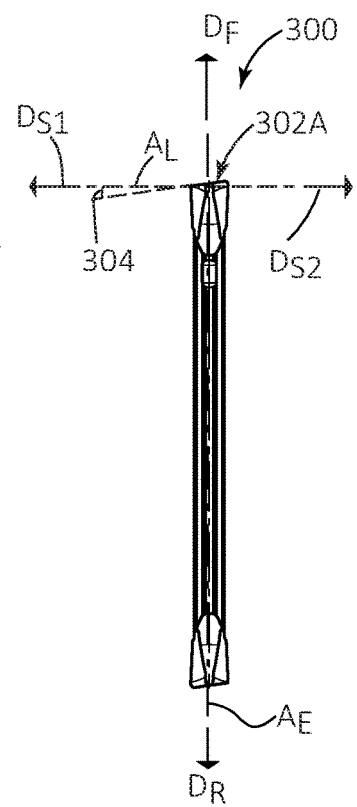
FIG. 4 is a plan view of a rake surface of yet another insert according to the present invention and only differing to the inserts in FIGS. 1 and 3 in that it is a "right" type insert.

FIGS. 1, 2 and 5A to 5E, illustrate an exemplary parting insert 100 according to the present invention, which will be described in additional detail below. FIGS. 3 and 4 also illustrate parting inserts according to the present invention but the differences to parting insert 100 have already been described above in sufficient detail.

The parting insert 100 comprises a first cutting portion 110, a second cutting portion 112 and an elongated body portion 114 connecting the first and second cutting portions.

An arrow designated "116" shows the area that a cutting portion (in this example the second cutting portion 112) transitions to become the elongated body portion 114 (hereinafter a "transition region 116"). While this is visible by the thinning of the cutting portion until it reaches the width of the elongated body portion, it should also be understood that a cutting portion is functionally connected to a cutting function (i.e. contact with a workpiece (not shown) and the chips which are machined therefrom), whereas a body portion is not configured to provide a cutting function.

The parting insert 100 further comprises a rake surface 118, a base surface 120 (also referred to as a "lower surface"; the base surface is devoid of cutting edges) and a peripheral surface 122.

Figure 1:
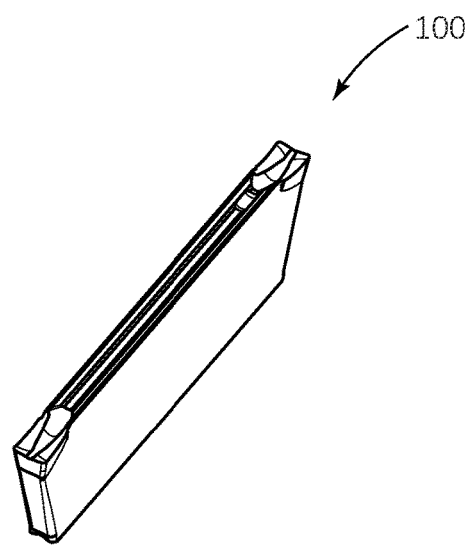
FIG. 1 is a perspective view of a parting insert according to the present invention.
Figure 2:
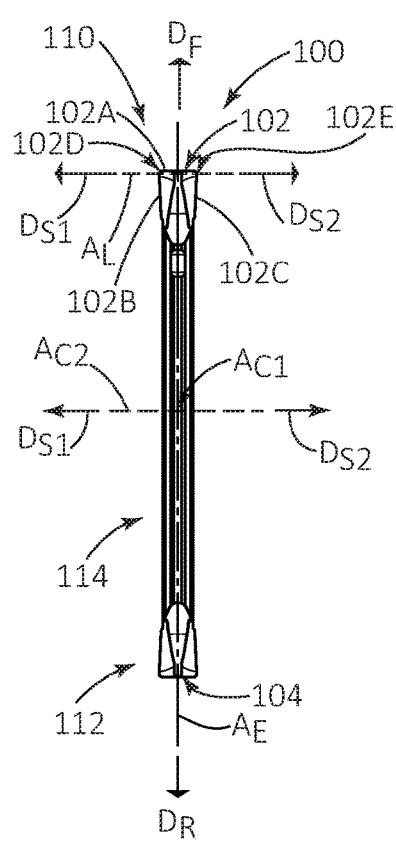
FIG. 2 is a plan view of a rake surface of the insert in FIG. 1.

Referring to FIG. 2, the body portion 114 is elongated along the elongation axis $A_E$ extending through the center thereof. The elongation axis $A_E$ defines a forward direction $D_F$ from the second cutting portion 112 towards the first cutting portion 110 and a rearward direction $D_R$ opposite thereto.

Figure 5A:
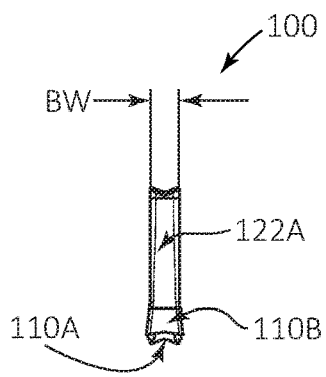
FIG. 5A is a front view of the insert in FIG. 1.
Figure 5B:
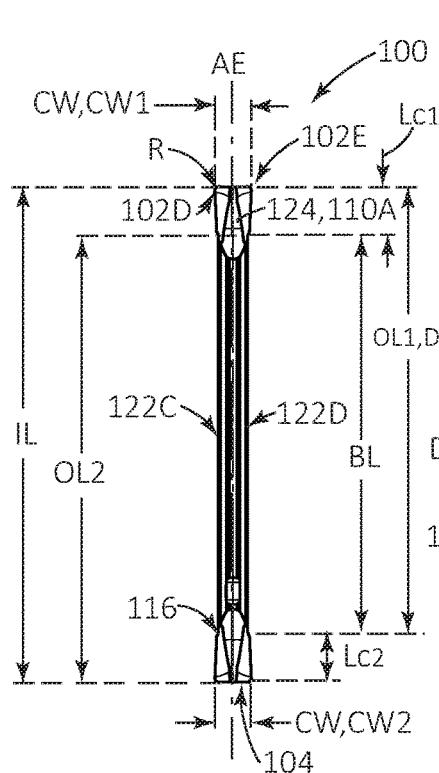
FIG. 5B is a plan view of the rake surface of the insert in FIG. 5A (and is an identical view to FIG. 2)
Figure 5C:
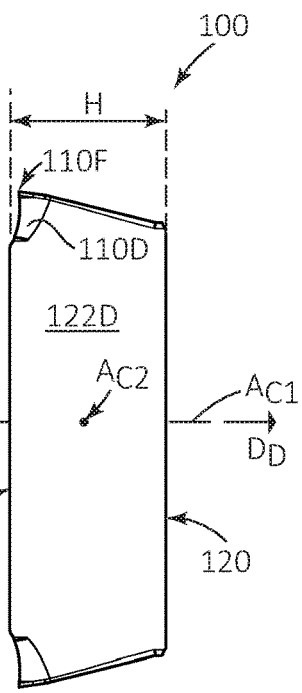
FIG. 5C is a right side view of the insert in FIG. 5A.
Figure 5D:
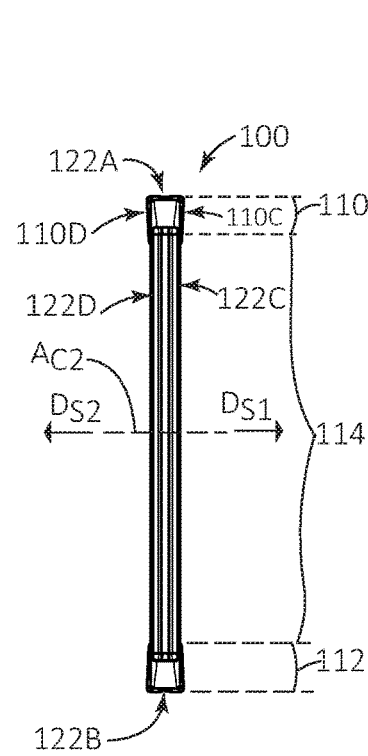
FIG. 5D is a bottom view of the insert in FIG. 5A.
Figure 5E:
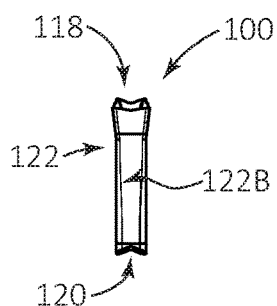
FIG. 5E is a rear view of the insert in FIG. 1.

Referring to the remainder of the figures as well, a first central axis $A_{C1}$ ("vertical axis") is defined as perpendicular to the elongation axis $A_E$ and extending through the center of the parting insert 100 and through the base surface 120 and rake surface 118, and, as shown in FIG. 5C, defines an upward direction $D_U$ and a downward direction $D_D$.

A second central axis $A_{C2}$ is defined as perpendicular to both the elongation axis $A_E$ and the first central axis $A_{C1}$ and extending through the center of the parting insert 100, the second central axis $A_{C2}$ defining a first side direction $D_{S1}$ a second side direction $D_{S2}$ opposite thereto.

The parting insert 100 comprises an insert length IL, measurable parallel to the elongation axis $A_E$.

For the sake of conciseness, some of the description below may be only made to one part of the parting insert 100, since it is rotationally symmetric about the first central axis $A_{C1}$ it should be understood that such features also exist at the opposing end thereof.

The peripheral surface 122 comprises a front sub-surface 122A at the first cutting portion 110, a rear sub-surface 122B located at the second cutting portion 112, a left sub-surface 122C and a right sub-surface 122D.

The first cutting portion 110 comprises a first sub-rake surface 110A at the rake surface 118. The first sub-rake surface 110A comprises a chip-former arrangement 124 in the form of a single depression.

The first cutting portion 110 further comprises a first front sub-relief surface 110B at the front sub-surface 122A, a first left sub-relief surface 110C at the left sub-surface 122C; a first right sub-relief surface 110D at the right sub-surface 122D. Notably, the preferred sub-relief surfaces (which are inwardly slanted) exemplified do not extend until the base surface 120, however it is also feasible for them to extend to the base surface 120. As shown in the preferred embodiment the sub-relief surfaces extend less than a third of the height H of the parting insert 100.

The first cutting edge 102 is formed at an intersection of the first front sub-rake surface 110A and each of the first front sub-relief surface 110B, first left sub-relief surface 110C and first right sub-relief surface 110D.

The portions of the cutting edge 102 are described above with reference to FIG. 2.

The first cutting portion 110 further comprises a first cutting portion length $L_{C1}$, measurable parallel to the elongation axis $A_E$. Similarly, the second cutting portion 112 can comprise a second cutting portion length $L_{C2}$.

Rearward of the cutting edge, in a plan view of the rake surface (22), similar to the front and lateral surfaces (24, 78, 80) of U.S. Pat. No. 11,278,968, at least a portion of the insert body directly adjacent to the rake surface is relieved from the cut width defined by the cutting edge (see FIG. 2C). Stated differently, said portion is thinner than the cut width (i.e. extends in an inward lateral direction on both sides), so the insert body does not contact the slit in the workpiece being formed by the cutting edge.

The first cutting edge 102 has a first cut width CW1 and the second cutting edge 104 has a second cut width CW2.

The elongated body portion 114 has a body width BW and a body length BL.

The insert length IL equals the body length BL plus the first and second cutting portion lengths $L_{C1}$, $L_{C2}$ (IL=BL+$L_{C1}$, +$L_{C2}$).

Since the parting insert 100 can only enter a slit until the width of the insert body becomes wider, (taking into account that body widths BW are designed to be as wide as possible even at the thinnest portion thereof to avoid unnecessary weakening of the structure) when the first cutting portion 100 is the operative cutting portion (i.e. the parting insert 100 is being moved, relatively, towards a workpiece in the forward direction $D_F$, the depth of cut DC is effectively equal to a first operative length OL1, measurable from a forwardmost point of the first cutting edge 102 until a transition region 116 between the elongated body portion 114 and the second cutting portion 112.

The parting insert 100 will have an identical depth of cut DC after the insert is indexed for the second cutting portion 112, i.e. a second operative length OL2.

The insert can have a first insert ratio R1 defined as the ratio of the depth of cut to the first cutting width (R1=DC/CW1). Thus, for an insert having a depth of cut DC=12 mm and a first cutting width CW1=1 mm, the first insert ratio is 12. Preferably, the first insert ratio R1 for a cutting insert in accordance with the subject matter of the present application fulfills the condition: $6 \leq R1 \leq 16$, more preferably $10 \leq R1 \leq 14$, and most preferably $11 \leq R1 \leq 13$.

The insert can have a second insert ratio R2 defined as the ratio of the insert's length IL to the insert's height H (R2=IL/H). Thus, for an insert having a length IL=14 mm and height H=4 mm, the second insert ratio is 3.5. Preferably, the second insert ratio R2 for a cutting insert in accordance with the subject matter of the present application fulfills the condition: $1 \leq R2 \leq 4.5$, more preferably $2.5 \leq R2 \leq 3.8$, and most preferably $3 \leq R2 \leq 3.6$.

What is claimed is:

1. A two-cutting-edge parting insert comprising:
   a first cutting portion;
   a second cutting portion;
   an elongated body portion connecting the first and second cutting portions;
   a rake surface;
   a base surface located opposite the rake surface; and
   a peripheral surface connecting the rake and base surfaces; the peripheral surface comprising:
      a front sub-surface at the first cutting portion;
      a rear sub-surface located at the second cutting portion and located opposite the front sub-surface;
      a left sub-surface connecting the front and rear sub-surfaces and located at one side of the parting insert; and
      a right sub-surface connecting the front and rear sub-surfaces and located opposite the left sub-surface;
   the body portion is elongated along an elongation axis extending through the center of the body portion;
   the elongation axis ($A_E$) defines a forward direction ($D_F$) from the second cutting portion towards the first cutting portion and a rearward direction ($D_R$) opposite to the forward direction;
   the parting insert having an insert length (IL) measured along the elongation axis ($A_E$);
   the parting insert having a height (H) measured perpendicular to the elongation axis ($A_E$);
   a first central axis ($A_{C1}$) is defined as perpendicular to the elongation axis and extending through the center of the parting insert and through the base surface and rake surface, the first central axis ($A_{C1}$) defining an upward direction ($D_U$) from the base surface towards the rake surface and a downward direction ($D_D$) opposite to the upward direction;
   a second central axis ($A_{C2}$) is defined as perpendicular to both the elongation axis ($A_E$) and the first central axis ($A_{C1}$) and extending through the center of the parting insert, the second central axis ($A_{C2}$) defining a first side direction ($D_{S1}$) and a second side direction ($D_{S2}$) opposite thereto;
   the first cutting portion comprising:
      a first sub-rake surface at the rake surface;
      a first front sub-relief surface at the front sub-surface;
      a first left sub-relief surface at the left sub-surface;
      a first right sub-relief surface at the right sub-surface;
      a first cutting edge formed at an intersection of the first front sub-rake surface and each of the first front sub-relief surface, first left sub-relief surface and first right sub-relief surface; the first cutting edge comprising:
         a first forwardmost cutting sub-edge extending along an intersection of the first sub-rake surface and the first front sub-relief surface;
         a first left side sub-edge extending along an intersection of the first sub-rake surface and the first left sub-relief surface;
         a first right side sub-edge extending along an intersection of the first sub-rake surface and the first right sub-relief surface;
         a first left corner formed at an intersection of the first forwardmost cutting sub-edge and the first left side sub-edge; and
         a first right corner formed at an intersection of the first forwardmost cutting sub-edge and the first right side sub-edge;
   the second cutting portion comprising:
      a second sub-rake surface at the rake surface;
      a second front sub-relief surface at the rear sub-surface;
      a second left sub-relief surface at the right sub-surface;
      a second right sub-relief surface at the left sub-surface;
      a second cutting edge formed at an intersection of the second front sub-rake surface and each of the second front sub-relief surface, second left sub-relief surface and second right sub-relief surface; the second cutting edge comprising:
         a second forwardmost cutting sub-edge extending along an intersection of the second sub-rake surface and the second front sub-relief surface;
         a second left side sub-edge extending along an intersection of the second sub-rake surface and the second left sub-relief surface;
         a second right side sub-edge extending along an intersection of the second sub-rake surface and the second right sub-relief surface;
         a second left corner formed at an intersection of the second forwardmost cutting sub-edge and the second left side sub-edge; and
         a second right corner formed at an intersection of the second forwardmost cutting sub-edge and the second right side sub-edge;
   a lateral axis ($A_L$) extends through a forwardmost part of the first cutting edge, the lateral axis ($A_L$) extending parallel to the second central axis ($A_{C2}$) and defining a first side direction (DS1) and a second side direction ($D_{S2}$) opposite first side direction ($D_{S1}$);

the first cutting edge has a first cut width (CW1) measurable parallel to the lateral axis and from the first left corner to the first right corner;

the second cutting edge has a second cut width (CW2) measurable parallel to the lateral axis and from the second left corner to the second right corner;

the elongated body portion has a body width (BW) measurable parallel to the lateral axis and a body length (BL) measurable parallel to the elongation axis;

wherein:
the body width (BW):
is smaller than both the first cut width (CW1) and the second cut width (CW2); and
fulfills the condition: 0.65 mm≤BW≤0.95 mm; and
the body length (BL):
fulfills the condition: 2 mm≤BL≤14 mm.

2. The parting insert according to claim 1, wherein the body width (BW) fulfills the condition: 0.75 mm≤BW.

3. The parting insert according to claim 1, wherein the body width (BW) fulfills the condition: BW≤0.85 mm.

4. The parting insert according to claim 1, wherein the body length (BL) fulfills the condition: 6 mm≤BL.

5. The parting insert according to claim 4, wherein the body length (BL) fulfills the condition: 8 mm≤BL.

6. The parting insert according to claim 1, wherein the body length (BL) fulfills the condition: BL≤12 mm.

7. The parting insert according to claim 6, wherein the body length (BL) fulfills the condition: BL≤11 mm.

8. The parting insert according to claim 1, wherein the first cut width (CW1) and the second cut width (CW2) fulfill the condition: 0.9 mm≤CW1, CW2≤1.1 mm.

9. The parting insert according to claim 8, wherein the first cut width (CW1) and the second cut width (CW2) fulfill the condition: 0.96 mm≤CW1, CW2≤1.04 mm.

10. The parting insert according to claim 1, wherein the parting insert has a first operative length (OL1), measurable parallel to the elongation axis ($A_E$) from a forwardmost point of the first cutting edge until an intersection of the body portion and the second cutting portion, fulfilling the condition: 5 mm≤OL1≤15 mm.

11. The parting insert according to claim 10, wherein the first operative length (OL1) fulfills the condition: 9 mm≤OL1≤13.5 mm.

12. The parting insert according to claim 11, wherein the first operative length (OL1) fulfills the condition: 11 mm≤OL1≤12.5 mm.

13. The parting insert according to claim 1, wherein the parting insert is devoid of ground surfaces.

14. The parting insert according to claim 1, wherein the parting insert is 180° rotationally symmetric about the first central axis.

15. The parting insert according to claim 1, wherein the height (H) of the body portion fulfills the condition 3.5 mm≤H≤4.5 mm.

16. The parting insert according to claim 15, wherein the height (H) of the body portion fulfills the condition: 4.0 mm≤H≤4.3 mm.

17. The parting insert according to claim 1, wherein each corner of each cutting edge has a radius (R) fulfilling the condition 0.8 mm≤R≤1.20 mm.

18. The parting insert according to claim 1, wherein each of the first and second cutting portions has a chip-former arrangement comprising a single depression.

19. The parting insert according to claim 1, wherein the first cutting portion further comprises a first cutting portion length ($L_{C1}$), measurable parallel to the elongation axis $A_E$ and fulfilling the condition 1.25 mm≤$L_{C1}$≤1.5 mm.

20. The parting insert according to claim 1, wherein a first insert ratio (R1) is defined as the ratio of a depth of cut (DC) to the first cutting width (CW1) (R1=DC/CW1), and fulfills the condition: 6≤R1≤16.

21. The parting insert according to claim 1, wherein a second insert ratio (R2) is defined as the ratio of the insert length (IL) to the insert height (H) (R2=IL/H), and fulfills the condition: 1≤R2≤4.5.

* * * * *